United States Patent

Koszarsky et al.

[11] Patent Number: 5,912,922
[45] Date of Patent: Jun. 15, 1999

[54] METHOD AND APPARATUS FOR MODULATION DIFFERENTIATION

[75] Inventors: Christopher Koszarsky, Holly Springs; John Northcutt, Chapel Hill; Michael Nowak, Cary, all of N.C.

[73] Assignee: Ericsson Inc., Research Triangle Park, N.C.

[21] Appl. No.: 09/105,809

[22] Filed: Jun. 26, 1998

Related U.S. Application Data

[62] Division of application No. 08/868,882, Jun. 4, 1997, Pat. No. 5,802,114.

[51] Int. Cl.$^6$ ................ H04B 3/46; H04B 17/00
[52] U.S. Cl. .................. 375/224; 455/226.2
[58] Field of Search .............. 375/224, 228, 375/216, 227; 455/226.1, 226.2, 142, 422

[56] References Cited

U.S. PATENT DOCUMENTS

| | | | |
|---|---|---|---|
| 5,214,391 | 5/1993 | Serizawa et al. | 329/316 |
| 5,228,074 | 7/1993 | Mizikovsky | 455/553 |
| 5,289,504 | 2/1994 | Wilson et al. | 375/316 |
| 5,577,087 | 11/1996 | Furuya | 375/222 |
| 5,598,430 | 1/1997 | Hachisuka et al. | 375/216 |
| 5,790,944 | 8/1998 | Karki et al. | 455/226.2 |

FOREIGN PATENT DOCUMENTS

| | | |
|---|---|---|
| 0 755 133 | 7/1996 | European Pat. Off. |
| 195 32 069 | 1/1997 | Germany |

OTHER PUBLICATIONS

EPO Search Report, Apr. 15, 1998, RS 100279 US.
PCT Search Report, Sep. 14, 1998, PCT/U:S 98/11338.
J. I. Portillo–Garcia, et al., "A Microcomputer–Based General Architecture for Radiocommunication Signal Classification and Digital Demodulation", Signal Processing V Sep. 18, 1990 pp. 1919–1922.
Chung, et al., "Envelope–Based Classification Schemes for Continuous–Phase Binary Frequency–Shift–Keyed Modulations", 1994 Military Communications Conference, Oct. 2, 1994, pp. 796–800.

*Primary Examiner*—Tesfaldet Bocure
*Attorney, Agent, or Firm*—Jenkens & Gilchrist

[57] ABSTRACT

To differentiate between different types of modulation, a fast RSSI detector performs a RSSI measurement on a received signal. The output of the RSSI detector is sampled over a sampling window and generates sampled values. A processor calculates absolute values of piecewise first derivatives of the sampled values and sums the result to create a summation constant. A modulation detector determines the type of modulation based on the value of the summation constant and an RSSI compensation calculates a compensation factor to correct the RSSI measurement.

2 Claims, 2 Drawing Sheets

METHOD AND APPARATUS FOR MODULATION DIFFERENTIATION

This application is a divisional of application Ser. No. 08/868,882, filed Jun. 4, 1997 and now U.S. Pat. No. 5,802,114.

BACKGROUND OF THE INVENTION

Technical Field of the Invention

The present invention pertains in general to techniques for detecting the type of modulation performed on a received radio frequency carrier signal, and more particularly, to a method and apparatus for distinguishing between analog frequency modulation and π/4 Differential Quadrature Phase Shift Key (DQPSK) modulation in a cellular telephone network.

Description of Related Art

Various types of radio frequency carrier signal modulations are used in cellular telephone networks. Two commonly used types are analog Frequency Modulation (FM) and π/4 Differential Quadrature Phase Shift Key (DQPSK) modulation. It is often necessary for a receiver to distinguish between analog FM and DQPSK modulation. For example, a hand-off of a cellular telephone call is based in part on a Received Signal Strength Indicator (RSSI) measurement of signals received by a cellular telephone receiver. Two signals having equal average transmission power, however, produce significantly different RSSI measurements depending on the type of modulation performed on the signals. The difference occurs since RSSI detectors currently in the marketplace such as Phillips Semiconductor RSSI chip numbers SA637 and SA647 do not produce an output which is accurately representative of the average power of the input Intermediate Frequency (IF) input signal. As a result, FM signals produce RSSI measurements which are greater than π/4 DQPSK modulated signals by a consistent delta. Therefore, to get an accurate RSSI measurement and comparison, an offset correction must be added to compensate for the type of modulation used.

It would be advantageous therefore, to devise a method and apparatus for distinguishing between analog FM signals and π/4 DQPSK modulated signals received by a receiver. Furthermore, it would be advantageous for such a method and apparatus to compensate for the type of modulation used when making a RSSI measurement and comparison. Such a method and apparatus would allow current RSSI measurement techniques to produce an output which is representative of the average power of the IF signal.

SUMMARY OF THE INVENTION

The present invention comprises a method and apparatus for distinguishing between different types of modulation of carrier waveforms. The method and apparatus further compensates for the type of modulation when making a received signal strength indicator measurement. A received signal strength measurement of a received radio frequency signal is sampled over a sampling window. An absolute value of a piecewise first derivative of the samples is calculated and the differences between subsequent samples forms a summation constant. The magnitude of the summation constant is indicative of the type of modulation and is used to calculate a compensation factor for correcting received signal strength indicator measurements.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
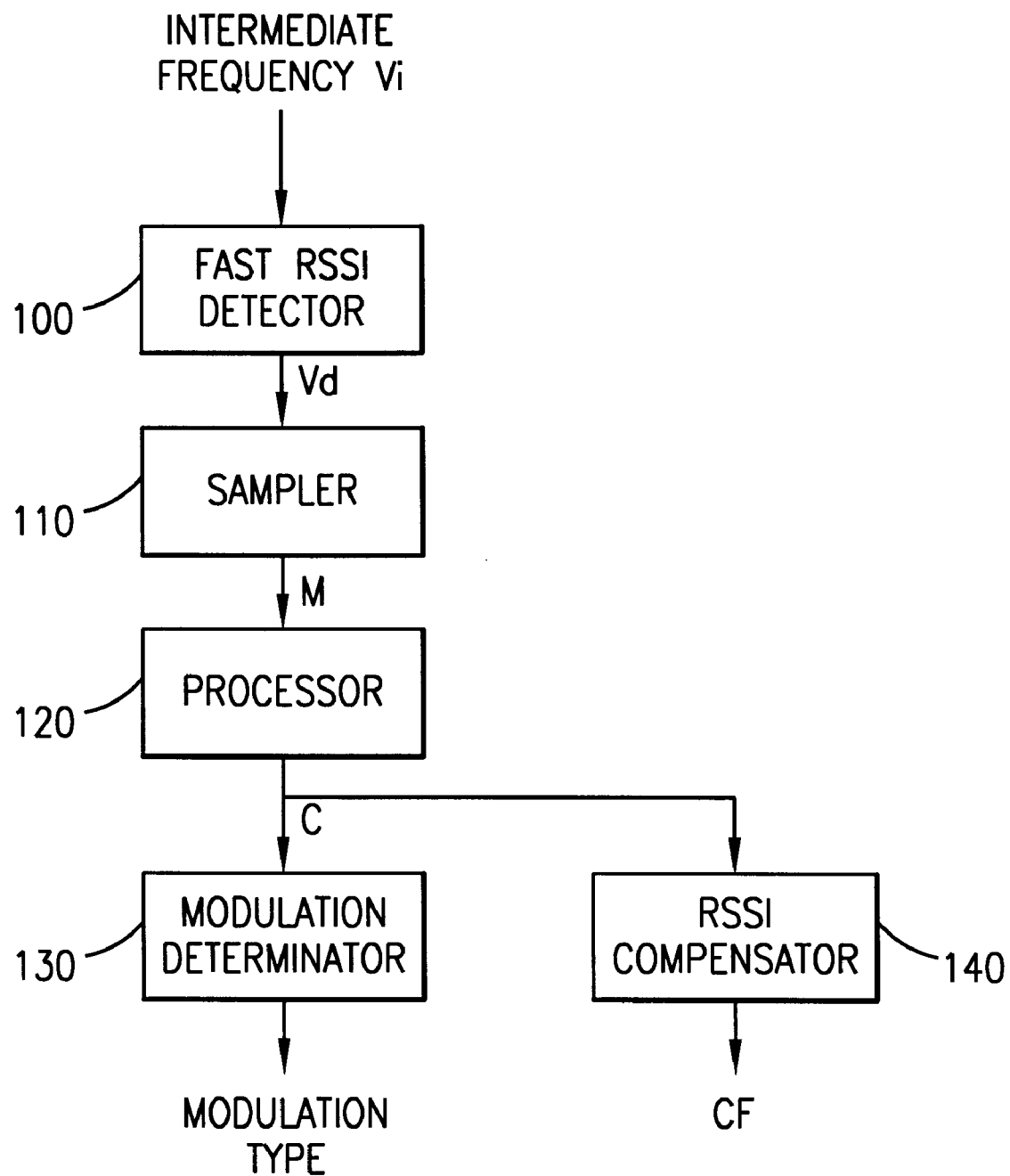
FIG. 1 is a functional block diagram of a preferred embodiment of the present invention.

Referring now to FIG. 1, there is illustrated a functional block diagram of a preferred embodiment of the present invention. A received radio frequency signal waveform having a voltage amplitude Vi measured in dBm is input to a fast RSSI detector 100. The RSSI detector 100 is considered fast in that it follows the amplitude envelope of a modulated carrier waveform. An example of such a RSSI detector is Phillips Semiconductor RSSI chip numbers SA637 and SA647. The RSSI detector 100 generates an output voltage waveform Vd, in a manner consistent with RSSI detectors currently in the marketplace, measured in volts whose magnitude is logarithmically proportional to the amplitude of the input waveform Vi according to the expression Vd=(k) (Vi) where k is a proportionality constant measured in units of Volts/dBm.

The waveform Vd generated by the RSSI detector 100 is input to a sampler 110. The sampler 110 samples the waveform Vd at a predetermined frequency. In the preferred embodiment the sampling frequency is one thousand nine hundred forty four samples per second. The resulting sampled values are chronologically stored in a vector M of length n where n is equal to the total number of samples taken during a sampling window $W_s$.

Vector M created by the sampler 110 is input to a processor 120. The processor 120 creates a vector P of length i where i=n−1. Vector P is equal to the absolute value of the piecewise first derivative of the vector M given by the expression P (i)=|M(i+1)−M(i)|. The individual elements of vector P are summed to produce a summation constant C given by the expression C=ΣP(i){i=1 . . . (n−1)}. The value of the summation constant C is subsequently used in determining the type of modulation preformed on the received signal.

To understand how the constant C is used to determine the type of modulation it is necessary to understand the characteristics of FM and π/4 DQPSK modulation. A received signal adhering to the random data π/4 DQPSK method of modulation as set forth for example, in International Standard 54 (IS-54) and International Standard 136 (IS-136) results in the RSSI detector 100 producing a waveform Vd containing distinctive amplitude transitions between symbols. In π/4 DQPSK modulation a symbol, representing one of eight states, is expressed by a distinct voltage and phase. Each state further represents distinct bit patterns of data. The transitions in the signal Vd occur at time intervals equal to the symbol rate which is approximately 41.15 microseconds per symbol for Digital Advanced Mobile Phone System (DAMPS) 800 and DAMPS 1900 protocols. For the RSSI sample window Ws, the minimum number of discrete RSSI transitions Tmin, which occur on the voltage waveform Vd is represented by the expression Tmin=Ws/41.15 microseconds. At every transition point in the signal Vd, vector P contains an element whose value is much greater than an element which does not correspond to a transition. Therefore, the value of the summation constant C is large for types of modulation producing many transitions in amplitude such as π/4 DQPSK modulation.

In contrast, a received signal adhering to analog FM as set forth in International Standard 19 (IS-19) and International Standard 20 (IS-20) is characterized by few if any changes in amplitude. Residual amplitude modulation, which may be present on the signal, is limited to a maximum of five percent by Telecommunication Industry Association (TIA) specifications. Thus, for the sample window Ws, there is an insignificant number of transitions producing a vector P with small element values. The summation of vector P, therefore, results in a summation constant C which is substantially less than that produced by the random data π/4 DQPSK modulated signal.

Once the summation constant C is calculated, the type of modulation used on the received signal is determined by a modulation determinator 130. If C>(k) (Tmin) (B1) (B2) where B1 is the average change in the RSSI detector 100 output Vd per transition measured in dB/transition, and B2 is the sampling measured sensitivity in bits/volt, then the signal is identified by determinator 130 as π/4 DQPSK modulated. On the other hand, if C<(k) (Tmin) (B1) (B2) then the signal is identified by determinator 130 as analog FM.

In addition to determining the type of modulation used, a compensation factor is calculated by a RSSI compensator 140 to correct RSSI measurements taken by the RSSI detector 100. In an ideal situation, FM signals need no compensation while random data π/4 DQPSK modulated signals require a compensation factor of 2.6 dB. In certain circumstances, however, FM signals include a small amplitude modulated component. Moreover, π/4 DQPSK modulated signals may contain a Digital Control Channel which often contains a string of continuous "0"s. The string of "0"s produces a signal with fewer transitions resulting in a summation constant smaller than that for a signal transmitting random data consistent with a traffic channel. Therefore, to obtain a more accurate measurement of RSSI, a graduated scale of compensation factors is required.

The Compensation Factor (CF) can be approximated by a linear approximation represented by a linear function CF= (m) (C)+b where m is an application dependent constant measured in dBm and b is an intercept constant measured in dB. The values of m and b are determined by simultaneously solving two expressions. The first expression represents a pure FM signal and the second expression represents a pure random data π/4 DQPSK modulated signal. For example, an AMPS FM signal sampled one hundred times produces a summation constant C of seventy eight. Since no compensation is required for pure FM signals, this situation is represented by the expression O=(m) (78)+b. Likewise, a pure random data π/4 DQPSK modulated signal sampled one hundred times yields a summation constant C of six hundred eighty four. Since a compensation factor CF equal to 2.6 dB is required for pure random data π/4 DQPSK modulated signals, this situation is represented by the expression 2.6=m(685)+b. Solving these expressions simultaneously yields m=4.29×$10^{-3}$ dB and b=-0.334 dB. Thus, a correction factor can be calculated by the expression CF=(4.290×$10^{-3}$ dB) C-0.334 dB. This expression produces a compensation factor which is added to an RSSI measurement and corrects the measurement independent of the type of modulation or data structure.

Figure 2:
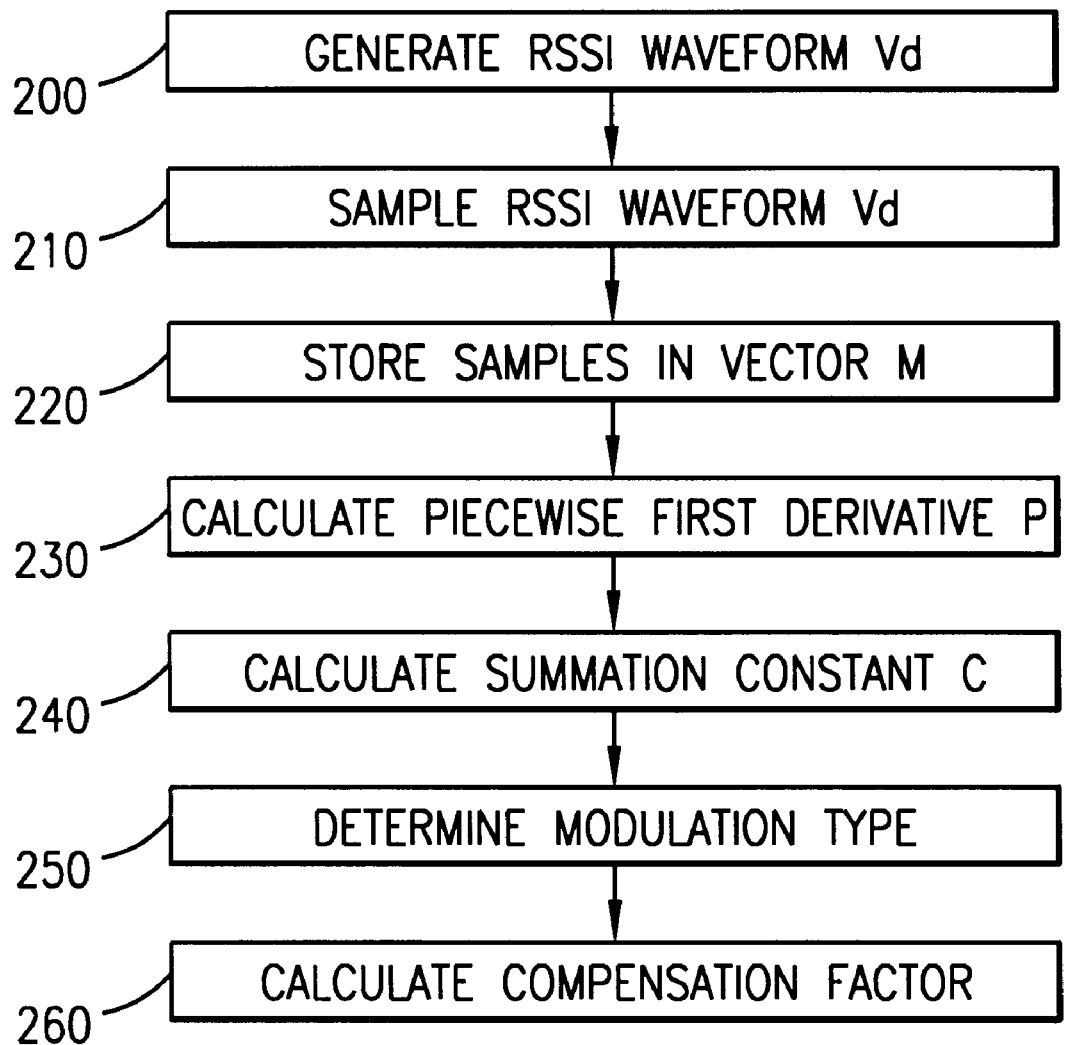
FIG. 2 is a flow diagram of a preferred method for implementing the present invention.

Referring now to FIG. 2 there is illustrated a flow diagram of a preferred method for implementing the present invention. An RSSI waveform Vd logarithmically proportional to the amplitude of a received radio frequency signal Vi is generated (step 200) according to the expression Vd=(k) (Vi) where k is a proportionality constant in units of volts per dBm. The RSSI waveform Vd is sampled at a predetermined frequency (step 210) which in the preferred embodiment is one thousand nine hundred forty-four samples per second. The samples are stored in a vector M (step 220) of length n where n is equal to the total number of samples taken during a sampling window $W_s$. A vector P is then created by calculating the absolute value of a piecewise first derivative of the vector M (step 230) given by the expression P(i)=|M (i+1)−M(i)|. The individual elements of vector P are then summed to produce a summation constant C (step 240).

The summation constant C is compared against the product (k) (Tmin) (B1) (B2), where Tmin is a minimum number of discrete RSSI transitions occurring during the sampling window, B1 is an average change in RSSI detector output Vd per transition measured in dB/transition, and B2 is a sampling sensitivity measured in bits/volt. The modulation type is then determined (step 250) based on the value of the summation constant. If C is greater than the product calculated above then the signal is π/4 DQPSK modulated. On the other hand, if C is less than the product calculated above the signal is analog FM. A compensation factor is then calculated (step 260) according to the expression CF=(4.290× $10^{-3}$ dB)C−0.334 dB.

Although the preferred embodiment described above distinguishes between FM and π/4 DQPSK it is understood that the method and apparatus can be used to distinguish between other types of carrier modulation as well. Furthermore, it is understood that the method and apparatus is not limited to cellular telephones. Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. An apparatus for calculating a compensation factor for incorporating into a received signal strength indicator measurement to compensate for measurement errors comprising:

a received signal strength indicator detector for generating a received signal strength indicator waveform whose value is logarithmically proportional to the amplitude of a received signal;

a sampler for sampling the generated received signal strength indicator waveform, the sampler sampling the received signal strength indicator waveform over a sampling window and generating sampled values;

a processor for calculating absolute values of piecewise first derivatives of the generated sampled values and further for calculating a summation constant equal to the sum of the absolute values of the piecewise first derivatives; and a received signal strength indicator compensator for calculating a received signal strength indicator compensation factor according to the expression CF=(4.290× $10^{-3}$)C−0.334 where CF is the compensation factor and C is the summation constant calculated by processor.

2. A method for calculating a compensation factor for incorporating into a received signal strength indicator measurement to compensate for measurement errors comprising:

generating a received signal strength indicator waveform whose value is logarithmically proportional to the amplitude of a received signal;

sampling the received signal strength indicator waveform over a sampling window and generating sampled values;

calculating absolute values of piecewise first derivatives of the sampled values;

calculating a summation constant equal to the sum of the absolute values of the piecewise first derivatives; and calculating a received signal strength indicator compensation factor according to the expression $CF=(4.290 \times 10^{-3})C+0.334$ where CF is the compensation factor and C is the summation constant calculated by processor.

* * * * *